United States Patent
Yamakawa et al.

(10) Patent No.: US 8,553,181 B2
(45) Date of Patent: Oct. 8, 2013

(54) LIQUID CRYSTAL DISPLAY DEVICE

(75) Inventors: Eishi Yamakawa, Hakusan (JP); Sakae Yoshida, Nonoichi (JP); Daichi Hosokawa, Nonoichi (JP); Junichi Kobayashi, Nomi-gun (JP); Takuho Maeda, Nonoichi (JP); Atsushi Yamazaki, Hakusan (JP)

(73) Assignee: Japan Display Central Inc., Fukaya-shi (JP)

( * ) Notice: Subject to any disclaimer, the term of this patent is extended or adjusted under 35 U.S.C. 154(b) by 0 days.

(21) Appl. No.: 13/489,046

(22) Filed: Jun. 5, 2012

(65) Prior Publication Data
US 2013/0027645 A1    Jan. 31, 2013

(30) Foreign Application Priority Data
Jul. 29, 2011 (JP) ................... 2011-167531

(51) Int. Cl.
G02F 1/1335    (2006.01)
(52) U.S. Cl.
USPC ............. 349/106; 349/84; 349/104; 349/105; 349/107; 349/108
(58) Field of Classification Search
USPC ............. 349/56, 84, 104, 105, 106, 107, 108
See application file for complete search history.

(56) References Cited

U.S. PATENT DOCUMENTS

| 7,283,195 B2 * | 10/2007 | Ryu ............................. 349/156 |
| 7,924,372 B2 * | 4/2011 | Sawasaki et al. ............. 349/106 |
| 2011/0242469 A1 | 10/2011 | Kawamura et al. |
| 2011/0310336 A1 | 12/2011 | Kobayashi et al. |

FOREIGN PATENT DOCUMENTS

| JP | 07-152022 | 6/1995 |
| JP | 2001-133787 | 5/2001 |
| JP | 2006-139299 | 6/2006 |
| JP | 2006-337590 | 12/2006 |

OTHER PUBLICATIONS

Office Action (with English translation) mailed on Jun. 25, 2013, in counterpart Japanese Appln No. 2011-167531 (4 pages).

* cited by examiner

*Primary Examiner* — Jennifer Doan
(74) *Attorney, Agent, or Firm* — Oblon, Spivak, McClelland, Maier & Neustadt, L.L.P.

(57) ABSTRACT

According to one embodiment, a liquid crystal display device includes a first substrate including pixel electrodes disposed, respectively, in a first color pixel on one end side of an active area and in a second color pixel on the other end side of the active area, a light-shield layer which surrounds the first color pixel and the second color pixel and extends to a peripheral area surrounding the active area, a first color filter disposed in the first color pixel, a second color filter disposed in the second color pixel, a dummy color filter which is stacked on the light-shield layer in the peripheral area, creates a distance between second color filter and the dummy color filter and is continuous with the first color filter.

20 Claims, 8 Drawing Sheets

LIQUID CRYSTAL DISPLAY DEVICE

CROSS-REFERENCE TO RELATED APPLICATIONS

This application is based upon and claims the benefit of priority from prior Japanese Patent Application No. 2011-167531, filed Jul. 29, 2011, the entire contents of which are incorporated herein by reference.

FIELD

Embodiments described herein relate generally to a liquid crystal display device.

BACKGROUND

By virtue of such features as light weight, small thickness and low power consumption, liquid crystal display devices have been used in various fields as display devices of OA equipment, such as personal computers, and TVs. In recent years, liquid crystal display devices have also been used as display devices of portable terminal equipment such as mobile phones, car navigation apparatuses, game machines, etc.

In such liquid crystal display devices, a pair of substrates are disposed to be opposed to each other, with a liquid crystal layer interposed. A cell gap for holding the liquid crystal layer is created by spacers between the paired substrates. It is desirable that such a cell gap be uniformly created, not only in an active area for displaying an image, but also in a peripheral area around the active area.

DETAILED DESCRIPTION

In general, according to one embodiment, a liquid crystal display device includes: a first substrate including pixel electrodes which are disposed, respectively, in a first color pixel on one end side of an active area and in a second color pixel on the other end side of the active area; a second substrate including a light-shield layer which surrounds the first color pixel and the second color pixel of the active area and extends to a peripheral area surrounding the active area, a first color filter which is disposed in the first color pixel, a second color filter which is disposed in the second color pixel, a dummy color filter which is stacked on the light-shield layer in the peripheral area, surrounds the active area, creates a first distance between second color filter and the dummy color filter and is continuous with the first color filter, and an overcoat layer which covers the light-shield layer, the first color filter, the second color filter and the dummy color filter; a columnar spacer configured to create a cell gap between the first substrate and the second substrate; a sealant which surrounds the dummy color filter in the peripheral area, is spaced apart from the dummy color filter, and attaches the first substrate and the second substrate; and a liquid crystal layer held between the first substrate and the second substrate.

According to another embodiment, a liquid crystal display device includes: a first substrate including pixel electrodes which are disposed, respectively, in a first color pixel on one end side of an active area and in a second color pixel on the other end side of the active area; a second substrate including a light-shield layer which surrounds the first color pixel and the second color pixel of the active area and extends to a peripheral area surrounding the active area, a first color filter which is disposed in the first color pixel, a second color filter which is disposed in the second color pixel and has a color different from a color of the first color filter, a dummy color filter which is stacked on the light-shield layer in the peripheral area, surrounds the active area, is spaced apart from the second color filter, is continuous with the first color filter and has the same color as the first color filter, and an overcoat layer which covers the light-shield layer, the first color filter, the second color filter and the dummy color filter; a columnar spacer configured to create a cell gap between the first substrate and the second substrate; a sealant which surrounds the dummy color filter in the peripheral area, is spaced apart from the dummy color filter, and attaches the first substrate and the second substrate; and a liquid crystal layer held between the first substrate and the second substrate.

According to another embodiment, a liquid crystal display device includes: a first substrate including pixel electrodes which are disposed, respectively, in a first color pixel on one end side of an active area and in a second color pixel on the other end side of the active area; a second substrate including a light-shield layer which surrounds the first color pixel and the second color pixel of the active area and extends to a peripheral area surrounding the active area, a first color filter which is disposed in the first color pixel, a second color filter which is disposed in the second color pixel, a dummy color filter which is stacked on the light-shield layer in the peripheral area, surrounds the active area and is spaced apart from the second color filter, and an overcoat layer which covers the light-shield layer, the first color filter, the second color filter and the dummy color filter; a columnar spacer configured to create a cell gap between the first substrate and the second substrate; a sealant which surrounds the dummy color filter in the peripheral area, is spaced apart from the dummy color filter, and attaches the first substrate and the second substrate; and a liquid crystal layer held between the first substrate and the second substrate.

Embodiments will now be described in detail with reference to the accompanying drawings. In the drawings, structural elements having the same or similar functions are denoted by like reference numerals, and an overlapping description is omitted.

Figure 1:
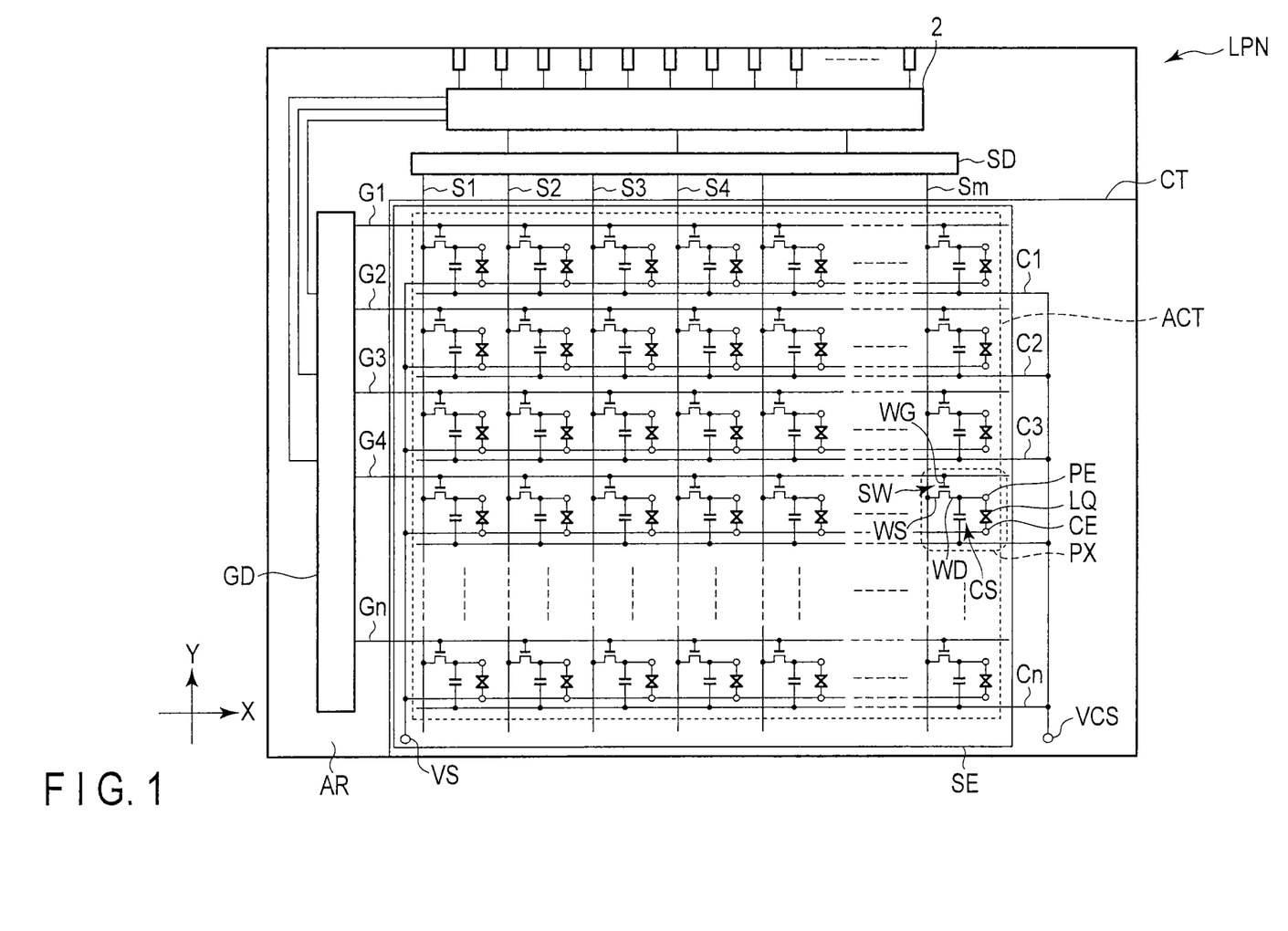
FIG. 1 is a view which schematically illustrates a structure and an equivalent circuit of a liquid crystal display device according to an embodiment.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN has a substantially rectangular plate shape, and includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The array substrate AR and counter-substrate CT are attached by a sealant SE.

The liquid crystal display panel LPN includes, in the inside surrounded by the sealant SE, an active area ACT which displays an image. The active area ACT is formed, for example, in a quadrangular shape (in particular, a rectangular shape), and is composed of a plurality of pixels PX which are arrayed in a matrix of m×n (m and n are positive integers).

The liquid crystal display panel LPN includes, in the active area ACT, a plurality of gate lines G (G1 to Gn), a plurality of storage capacitance lines C (C1 to Cn), and a plurality of source lines S (S1 to Sm). The gate lines G and storage capacitance lines C extend substantially linearly, for example, in a first direction X. The gate lines G and storage capacitance lines C are alternately arranged in parallel along a second direction Y crossing the first direction X. In this example, the first direction X and the second direction Y are perpendicular to each other. The source lines S cross the gate lines G and storage capacitance lines C. The source lines S extend substantially linearly along the second direction Y. It is not always necessary that each of the gate lines G, storage capacitance lines C and source lines S extend linearly, and a part thereof may be bent.

Each of the gate lines G is led out to the outside of the active area ACT and is connected to a gate driver GD. Each of the source lines S is led out to the outside of the active area ACT and is connected to a source driver SD. At least parts of the gate driver GD and source driver SD are formed on, for example, the array substrate AR, and are connected to a driving IC chip 2 which incorporates a controller.

Each of the pixels PX of the active area ACT includes a switching element SW, a pixel electrode PE and a common electrode CE. The switching element SW and pixel electrode PE are provided on the array substrate AR. The common electrode CE may be provided on the array substrate or may be provided on the counter-substrate CT. A storage capacitance CS is formed, for example, between the storage capacitance line C and, for example, an electrode having the same potential as the pixel electrode PE. The storage capacitance line C is electrically connected to a voltage application module VCS to which a storage capacitance voltage is applied.

The switching element SW is electrically connected to the gate line G and source line S. The switching element SW is composed of, for example, an n-channel thin-film transistor (TFT). The switching element SW may be of a top gate type or a bottom gate type. In addition, a semiconductor layer of the switching element SW is formed of, for example, polysilicon, but it may be formed of amorphous silicon.

A gate electrode WG of the switching element SW is electrically connected to the gate line G (or the gate electrode WG is formed integral with the gate line G). A source electrode WS of the switching element SW is electrically connected to the source line S (or the source electrode WS is formed integral with the source line S). A drain electrode WD of the switching element SW is electrically connected to the pixel electrode PE.

The pixel electrodes PE are disposed in the respective pixels PX, and are electrically connected to the switching elements SW. The common electrode CE is disposed common to the pixel electrodes PE of plural pixels PX. The pixel electrodes PE and common electrode CE are formed of a light-transmissive, electrically conductive material such as indium tin oxide (ITO) or indium zinc oxide (IZO).

The array substrate AR includes a power supply module VS for applying a voltage (e.g. common potential) to the common electrode CE. The power supply module VS is formed, for example, on the outside of the active area ACT. The common electrode CE is led out to the outside of the active area ACT, and is electrically connected to the power supply module VS via an electrically conductive member (not shown).

Figure 2:
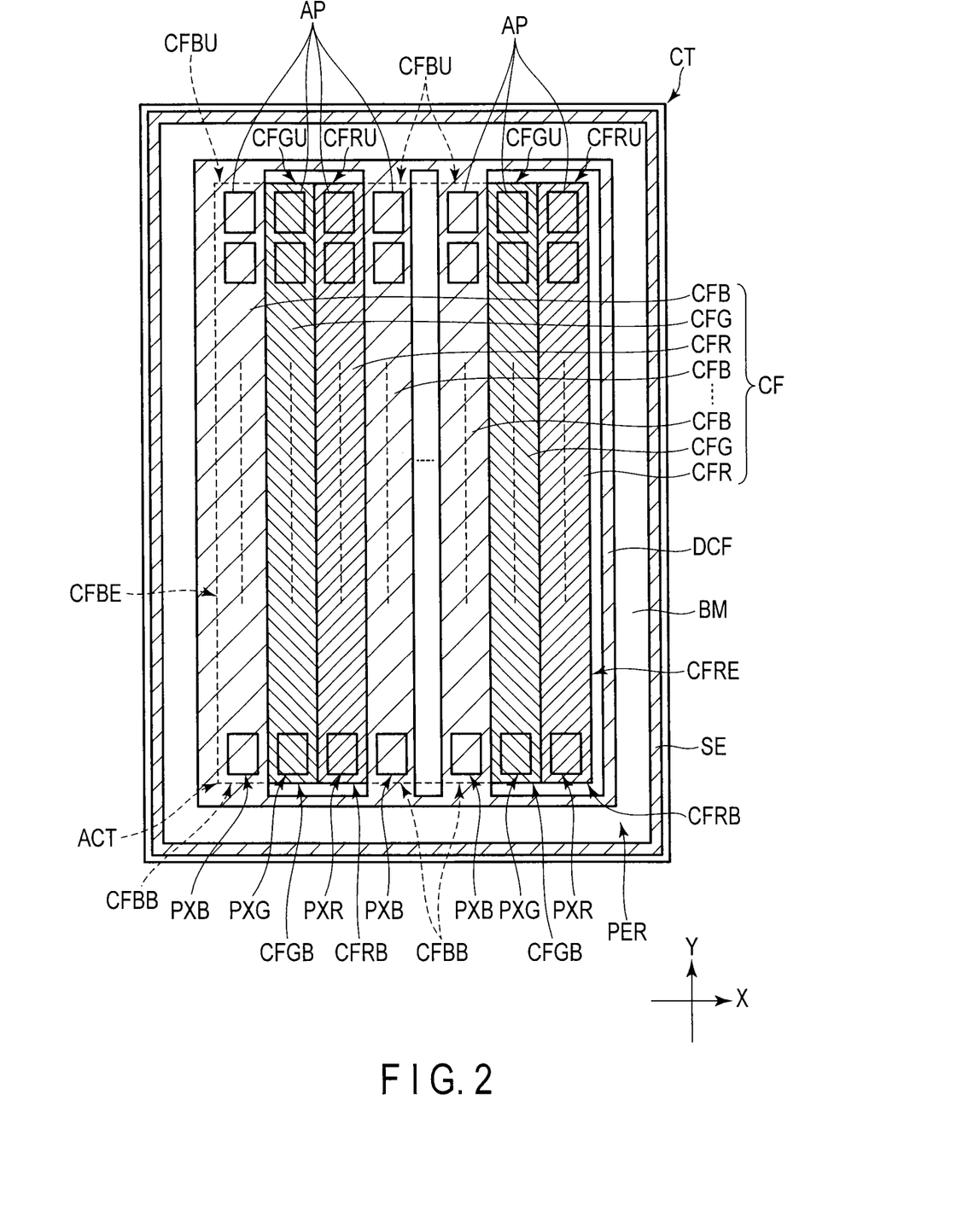
FIG. 2 is a plan view which schematically shows a structure of a counter-substrate shown in FIG. 1.

FIG. 2 is a plan view which schematically shows a structure of the counter-substrate CT shown in FIG. 1.

In the active area ACT indicated by a broken line, a blue pixel PXB, a green pixel PXG, a red pixel PXR, a blue pixel PXB, . . . , a blue pixel PXB, a green pixel PXG, and a red pixel PXR are arranged in the named order from the left to the right in FIG. 2 in the first direction X. Specifically, the blue pixel PXB is located on one end side (the leftmost end in FIG. 2) of the active area ACT, and the red pixel PXR is located on the other end side (the rightmost end in FIG. 2) of the active area ACT. In addition, in the active area ACT, color pixels of the same color are arranged in the second direction Y. In the meantime, in the example illustrated, the red pixel PXR is located on the other end side of the active area ACT, but the pixel of another color, for example, the green pixel PXG, may be located on the other end side of the active area ACT.

The counter-electrode CT includes a light-shield layer BM, color filters CF, and a dummy color filter DCF. The light-shield layer BM includes aperture portions AP which are formed in association with the respective color pixels. Specifically, the light-shield layer BM surrounds the respective color pixels of the active area ACT, and is formed in a grid shape. The light-shield layer BM extends from the active area ACT to a peripheral area PER surrounding the active area ACT.

The color filters CF include a blue color filter CFB which is disposed in association with the blue pixel PXB, a green color filter CFG which is disposed in association with the green pixel PXG, and a red color filter CFR which is disposed in association with the red pixel PXR. A blue color filter CFB is formed of a resin material that is colored in blue. A green color filter CFG is formed of a resin material that is colored in green. A red color filter CFR is formed of a resin material that is colored in red.

The color filters CF extend in the second direction Y, and are disposed over plural color pixels of the same color. The color filters CF are disposed on the aperture portions AP of the respective color pixels, and also extend over the light-shield layer BM. Boundaries between the color filters CF are located at positions overlapping the light-shield layer BM.

Specifically, the blue color filter CFB is disposed on the aperture portions AP of the blue pixels PXB which are arranged in the second direction Y, and overlaps the light-shield layer BM between the aperture portions AP of the blue pixels PXB. The green color filter CFG is disposed on the aperture portions AP of the green pixels PXG which are arranged in the second direction Y, and overlaps the light-shield layer BM between the aperture portions AP of the green pixels PXG. The red color filter CFR is disposed on the aperture portions AP of the red pixels PXR which are arranged in the second direction Y, and overlaps the light-shield layer BM between the aperture portions AP of the red pixels PXR. The boundary between the blue color filter CFB and green color filter CFG, the boundary between the green color filter CFG and red color filter CFR and the boundary between the blue color filter CFB and red color filter CFR overlap the light-shield layer BM.

The dummy color filter DCF is disposed in the peripheral area PER and is stacked on the light-shield layer BM. This dummy color filter DCF is disposed in a manner to surround the active area ACT, and for example, is formed in a rectangular frame shape. This dummy color filter DCF is formed of a resin material that is colored in blue which is, of the red, green and blue, lowest in relative luminous efficiency.

The dummy color filter DCF is spaced apart from the red color filter CFR and green color filter CFG of the active area ACT. Specifically, an edge CFRE of the red color filter CFR, which is disposed on the red pixels PXR that are located on the other end side of the active area ACT, is opposed to the dummy color filter DCF, and a gap is created between the edge CFRE and the dummy color filter DCF. In addition, an upper end CFRU and a lower end CFRB of the red color filter CFR, which is disposed on the red pixels PXR of the active area ACT, and an upper end CFGU and a lower end CFGB of the green color filter CFG, which is disposed on the green pixels PXG of the active area ACT, are opposed to the dummy color filter DCF, and gaps are created between these edges and the dummy color filter DCF.

In the example illustrated, the dummy color filter DCF is continuous with the blue color filter CFB of the active area ACT. Specifically, the blue color filter CFB, which is disposed on the blue pixels PXB located on the one end side of the active area ACT, extends from the active area ACT to the peripheral area PER, and the blue color filter CFB is continuous with the dummy color filter DCF at each of an edge CFBE, an upper end CFBU and a lower end CFBB which are located at boundaries between the active area ACT and the peripheral area PER. In other words, the blue color filter CFB, which is disposed on the blue pixels PXB located on the one end side of the active area ACT, is formed continuous with the dummy color filter DCF, and no gap is created between this blue color filter CFB and the dummy color filter DCF. In addition, the upper ends CFBU and lower ends CFBB of the other blue color filters CFB, which are disposed on the other blue pixels PXB of the active area ACT, are similarly continuous with the dummy color filter DCF.

The sealant SE is disposed in the peripheral area PER and overlaps the light-shield layer BM. The sealant SE is disposed in a manner to surround the dummy color filter DCF and is formed in a rectangular frame shape. In addition, the sealant SE is spaced apart from the dummy color filter DCF, and a gap is created between the sealant SE and the dummy color filter DCF.

Figure 3:
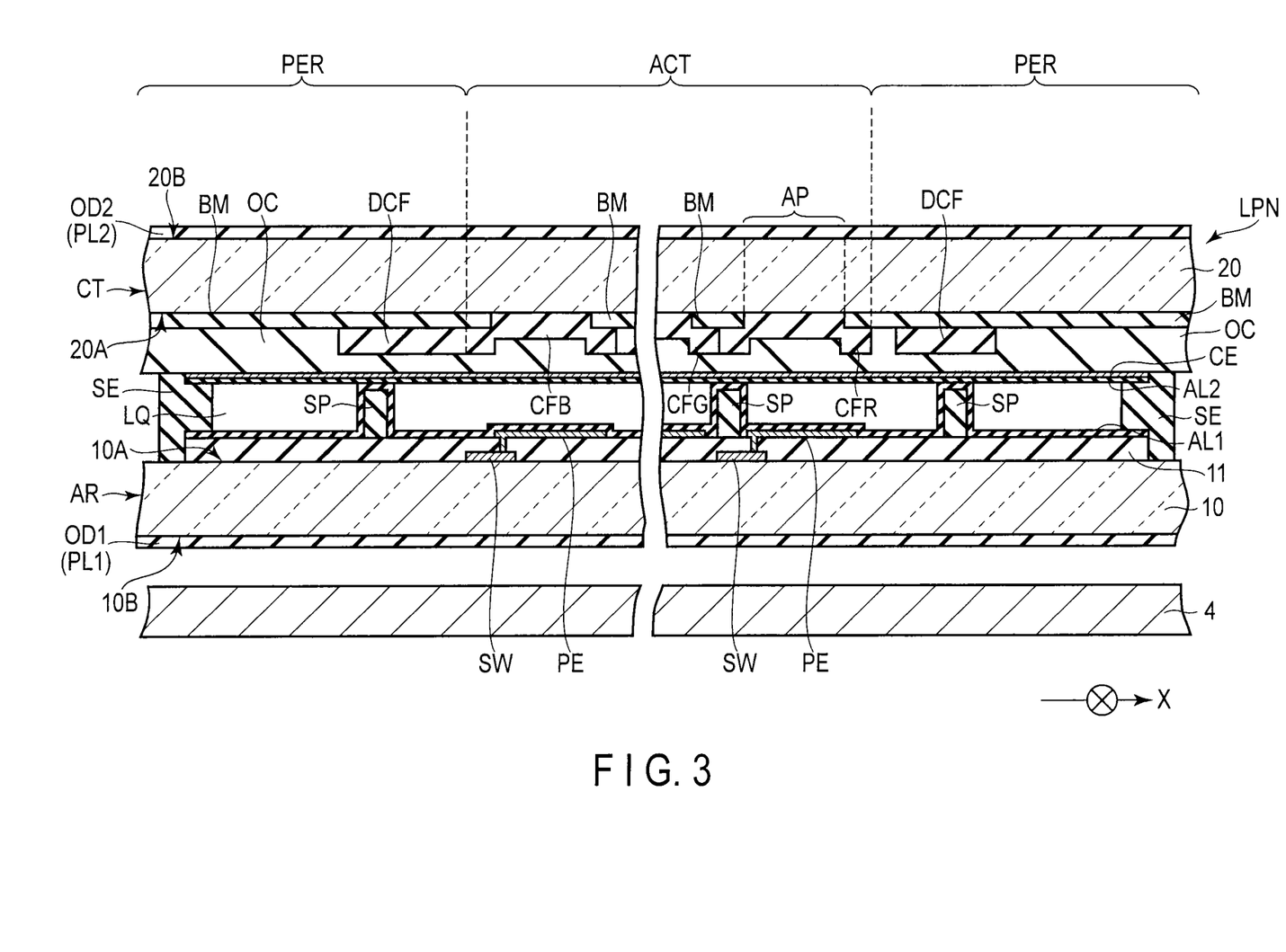
FIG. 3 is a cross-sectional view which schematically shows a cross-sectional structure of a liquid crystal display panel shown in FIG. 2.

FIG. 3 is a cross-sectional view which schematically shows a cross-sectional structure of the liquid crystal display panel LPN shown in FIG. 2. FIG. 3 shows only those parts of the cross section of the liquid crystal display panel LPN along the first direction X, which are necessary for the description. FIG. 3 corresponds to the case in which the common electrode CE is provided on the counter-substrate CT.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. The array substrate AR includes switching elements SW, pixel electrodes PE and a first alignment film AL1.

The switching element SW is disposed on an inner surface 10A of the first insulative substrate 10, which is opposed to the counter-substrate CT, and is covered with an interlayer insulation film 11. The pixel electrode PE is disposed on the interlayer insulation film 11. The pixel electrode PE is electrically connected to the switching element SW via a contact hole which is formed in the interlayer insulation film 11.

The first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE, etc., and is also disposed over the interlayer insulation film 11.

The counter-substrate CT is formed by using a second insulative substrate 20 having light transmissivity. The counter-substrate CT includes a light-shield layer BM, color filters CF, an overcoat layer OC, a common electrode CE, and a second alignment film AL2.

The light-shield layer BM partitions the pixels in the active area ACT and forms aperture portions AP which are opposed to the pixel electrodes PE. Specifically, the light-shield layer BM is disposed so as to be opposed to wiring portions, such as source lines, gate lines, storage capacitance lines, and switching elements SW. In addition, the light-shield layer BM also extends over the peripheral area PER. The light-shield layer BM is disposed on an inner surface 20A of the second insulative substrate 20, which is opposed to the array substrate AR.

The red color filter CFR, blue color filter CFB and green color filter CFG are arranged in association with the respective pixels in the active area ACT. These color filters CF are disposed on the aperture portions AP in the inner surface 20A of the second insulative substrate 20, and portions of the color filters CF extend over the light-shield layer BM.

The dummy color filter DCF is disposed in the peripheral area PER. The dummy color filter DCF is stacked on that surface of the light-shield layer BM, which is opposed to the array substrate AR. In addition, the dummy color filter DCF is formed to be integral or continuous with the blue color filter CFB which is located on one end side of the active area ACT, and is spaced apart from the red color filter CFR which is located on the other end side of the active area ACT. Specifically, the blue color filter CFB located on the one end side of the active area ACT extends from the position, which is opposed to the pixel electrode PE, to the peripheral area PER, and extends over the light-shield layer BM, thus forming the dummy color filter DCF.

The overcoat layer OC covers the color filters CF of the active area ACT, the dummy color filter DCF of the peripheral area PER, and the light-shield layer BM of the peripheral area PER (i.e. the light-shield layer BM which is exposed from between the dummy filter DCF and the red color filter CFR, and the light-shield layer BM which is located outside the dummy color filter DCF). The overcoat layer OC reduces the effect of asperities on the surfaces of these parts.

The common electrode CE is formed on that side of the overcoat layer OC, which is opposed to the array substrate AR. The second alignment film AL2 is disposed on that surface of the counter-substrate CT, which is opposed to the array substrate AR, and the second alignment film AL2 extends over substantially the entirety of the active area ACT. The second alignment film AL2 covers the common electrodes CE, etc.

The above-described array substrate AR and counter-substrate CT are disposed such that their first alignment film AL1 and second alignment film AL2 are opposed to each other. In this case, columnar spacers SP, which are formed of, e.g. a resin material so as to be integral to one of the array substrate AR and counter-substrate CT, are disposed between the array substrate AR and the counter-substrate CT, and a predetermined cell gap, for example, a cell gap of 2 µm to 7 µm, is created. The array substrate AR and counter-substrate CT are attached by the sealant SB on the outside of the active area ACT in the state in which the predetermined cell gap is created therebetween.

In the example illustrated, the columnar spacers SP are provided on the array substrate AR. The columnar spacers SP are formed on the interlayer insulation film 11, and are covered with the first alignment film AL1. The columnar spacers SP are disposed not only in the active area ACT but also in the peripheral area PER. In the active area ACT, the columnar spacers SP are located, for example, immediately under the light-shield layer BM. In the peripheral area PER, the columnar spacers SP are located, for example, immediately under the dummy color filter DCF. Specifically, in the peripheral area PER, the dummy color filter DCF is located between the columnar spacers SP and the light-shield layer BM.

The liquid crystal layer LQ is held in the cell gap which is created between the array substrate AR and the counter-substrate CT, and is disposed between the first alignment film AL1 and second alignment film AL2.

A first optical element OD1 including, e.g. a first polarizer PL1 is attached by, e.g. an adhesive, to an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4.

A second optical element OD2 including, e.g. a second polarizer PL2 is attached by, e.g. an adhesive, to an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN.

According to the present embodiment, the color filters CF are disposed in the active area ACT, while the dummy color filter DCF is stacked on the light-shield layer BM in the peripheral area PER. Thus, the surface of the overcoat layer OC, which covers the color filters CF of the active area ACT and the dummy color filter DCF of the peripheral area PER, can be smoothed. Specifically, it is possible reduce a stepped portion between the surface of the overcoat layer OC in the active area ACT and the surface of the overcoat layer OC in the peripheral area PER. Thereby, the columnar spacers SP, which are disposed in the active area ACT and the peripheral area PER, can create a substantially uniform cell gap in the active area ACT and peripheral area PER.

In the display mode in which an image is displayed by making use of birefringence in the liquid crystal layer LQ, the difference in cell gap becomes a difference in retardation $\Delta n \times d$ ($\Delta n$ is refractive index anisotropy, and d is the thickness of liquid crystal layer LQ, that is, a cell gap) of the liquid crystal layer LQ. Thus, if a difference occurs between the cell gap in the central part of the active area ACT and the cell gap in the peripheral part of the active area ACT, there is concern that such the difference in cell gap (or the difference in retardation of the liquid crystal layer LQ) may be visually recognized as a difference in transmittance when a single-color screen is displayed.

According to the embodiment, since substantially equal cell gaps can be created in the active area ACT and peripheral area PER, a substantially uniform cell gap can be created in the central part and peripheral part of the active area ACT and a single-color screen with a substantially uniform transmittance can be displayed. Therefore, a liquid crystal display device with a good display quality can be provided.

In addition, according to the embodiment, the dummy color filter DCF of the peripheral area PER is spaced apart from at least a color filter CF which is one of the color filters CF of the active area ACT and has a color different from the color of the dummy color filter DCF. In the above-described example, the dummy color filter DCF is blue, and is formed of the same material as the blue color filter CFB. Thus, the dummy color filter DCF is spaced part from the red color filter CFR and green color filter CFG. Thereby, it becomes possible to suppress formation of an undesired stepped portion due to overlapping of color filters of different colors.

However, if the distance from the color filter CF of the active area ACT to the dummy color filter DCF of the peripheral area PER is too large, the leveling property of the overcoat layer OC located therebetween tends to lower. According to the study by the inventor, it was confirmed that the smoothness of the surface of the overcoat layer OC can be maintained by setting the distance between the color filter CF of the active area ACT and the dummy color filter DCF of the peripheral area PER in the range of 2 µm to 10 µm.

In the above-described example, the dummy color filter DCF is continuous with the color filter of the same color in the active area ACT (in this example, the blue color filter CFB). Accordingly, the dummy color filter DCF is formed by using the same material as the blue color filter CFB in the same fabrication step as the blue color filter CFB, and an additional fabrication step for forming the dummy color filter DCF is needless. In the case where the dummy color filter DCF and blue color filter CFB are continuous, the thickness of the overcoat layer OC, which covers the dummy color filter DCF and blue color filter CFB, increases in some cases, but it was confirmed according to the study by the inventor that the smoothness of the surface of the overcoat layer OC is maintained.

As regards the width of the dummy color filter DCF, if this width is too small, it becomes difficult to maintain the smoothness of the overcoat layer OC, and it also becomes difficult to secure a margin for alignment with the columnar spacers SP disposed in the peripheral area PER. Conversely, if the width of the dummy color filter DCF is too large, there is a tendency that interference occurs with a structural part disposed at the periphery of the dummy color filter DCF (e.g. an outermost peripheral dummy color filter which will be described later), and that the thickness of the overcoat layer OC covering the dummy color filter DCF becomes large. According to the study by the inventor, it was confirmed that the smoothness of the surface of the overcoat layer OC can be maintained, without the thickness of the overcoat layer OC being excessively increased, by setting the width of the dummy color filter DCF in the range of 20 µm to 50 µm.

The inventor measured V-T characteristics with respect to a case in which the dummy color filter DCF of the embodiment was disposed, and a comparative example in which the dummy color filter DCF was not disposed.

Figure 4:
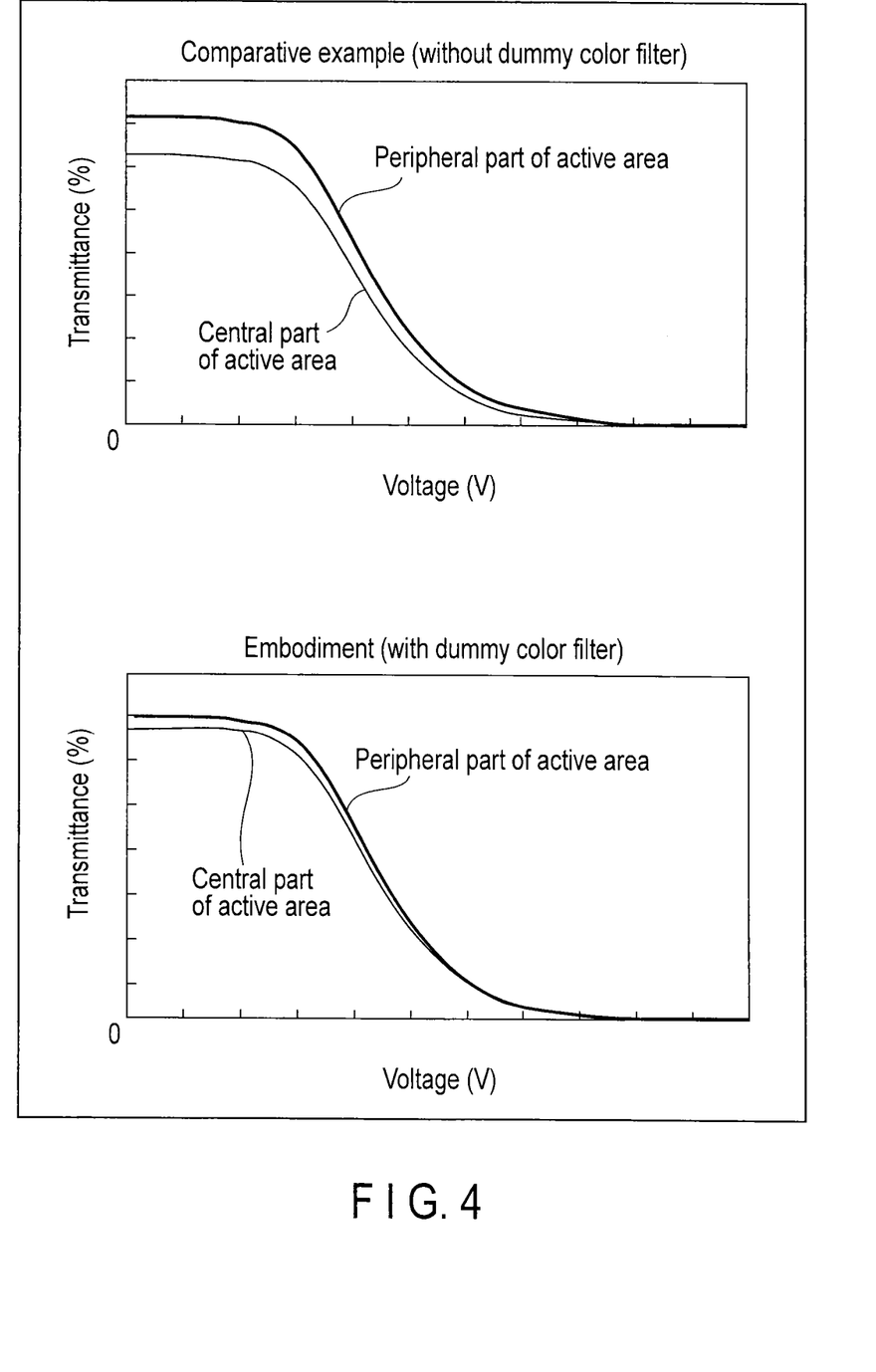
FIG. 4 shows measurement results of V-T characteristics of liquid crystal display panels in the embodiment and a comparative example.

FIG. 4 shows measurement results of V-T characteristics of liquid crystal display panels in the embodiment and the comparative example. In FIG. 4, the abscissa indicates an application voltage to the liquid crystal layer LQ, the ordinate indicates transmittance, and the scales of the abscissa and ordinate are equal in the V-T characteristics of the embodiment and the comparative example.

In the V-T characteristics of the comparative example shown in an upper part of FIG. 4, an error occurs in transmittance between the central part and peripheral part of the active area. According to a different viewpoint, when the same transmittance is to be obtained on the low voltage side, the application voltage in the peripheral part of the active area shifts to a higher voltage side than the application voltage in the central part of the active area. In this comparative example, when the same voltage is applied to all pixels of the active area, a difference in transmittance between the central part and the peripheral part tends to be easily recognized.

In the V-T characteristics of the embodiment shown in a lower part of FIG. 4, a substantially equal transmittance can be obtained in the central part and peripheral part of the active area at each of application voltages. According to a different viewpoint, when the same transmittance is to be obtained on the low voltage side, the application voltage in the peripheral part of the active area is substantially equal to the application voltage in the central part of the active area. In this embodiment, it was confirmed that when the same voltage is applied to all pixels of the active area, a substantially equal transmittance is obtained over the entirety of the active area.

Next, other structure examples of the embodiment are described. The same structural parts as described in the above example are denoted by like reference numerals, and a detailed description thereof is omitted.

Figure 5:
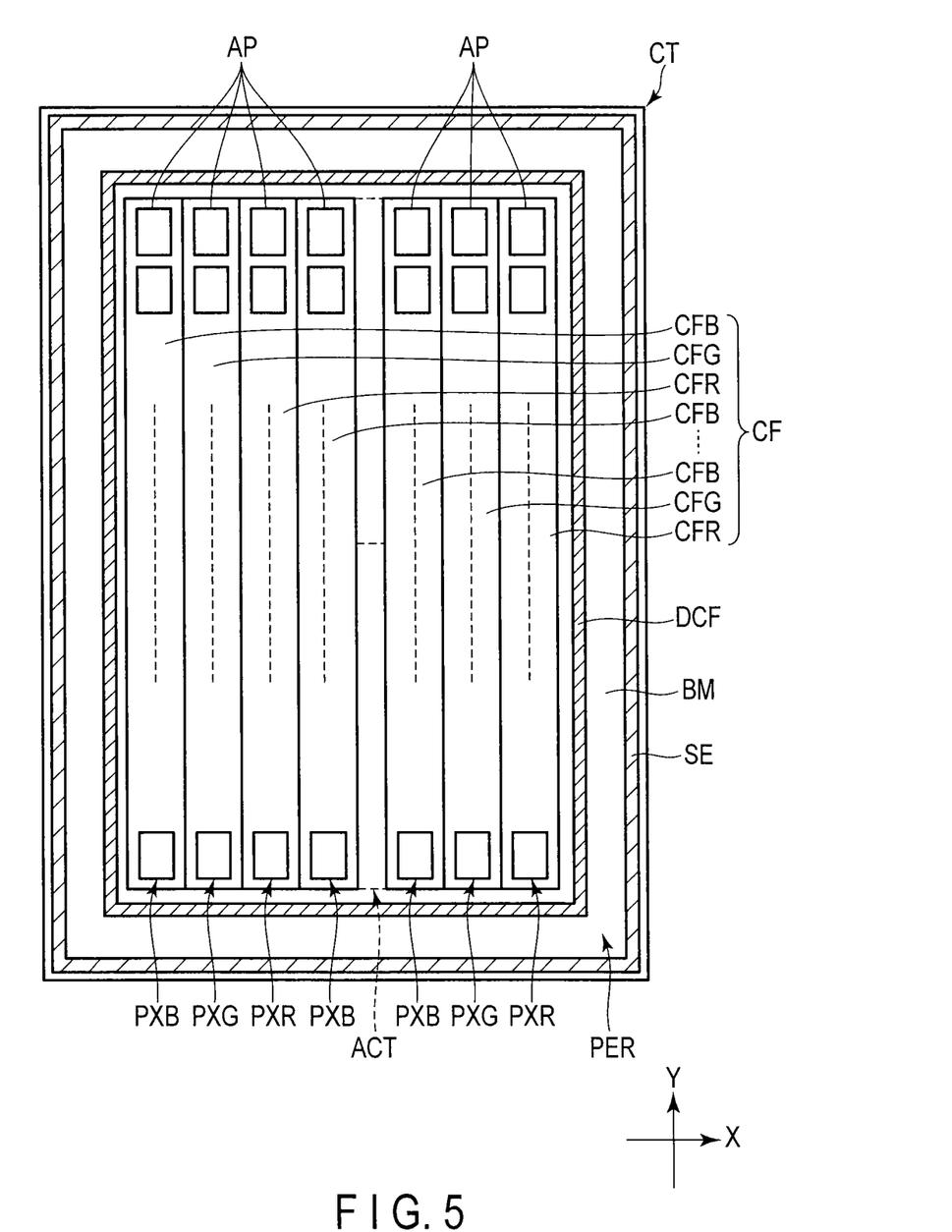
FIG. 5 is a plan view which schematically shows another structure of the counter-substrate which is applicable to the liquid crystal display device of the embodiment.

FIG. 5 is a plan view which schematically shows another structure of the counter-substrate CT which is applicable to the liquid crystal display device of the embodiment.

The structure shown in FIG. 5 differs from the structure shown in FIG. 2 in that the dummy color filter DCF is spaced apart from the blue color filter CFB. Needless to say, the dummy color filter DCF is spaced apart from the red color filter CFR and green color filter CFG. Specifically, gaps are created between the dummy color filter DCF of the peripheral area PER and the four sides of the rectangular active area ACT.

This dummy color filter DCF has the same color as the blue color filter CFB, for instance, as in the above-described example, and is formed of a resin material which is colored in blue. In the example shown in FIG. 5, the dummy color filter DCF may be formed of a resin material which is colored in red or a resin material which is colored in green.

Figure 6:
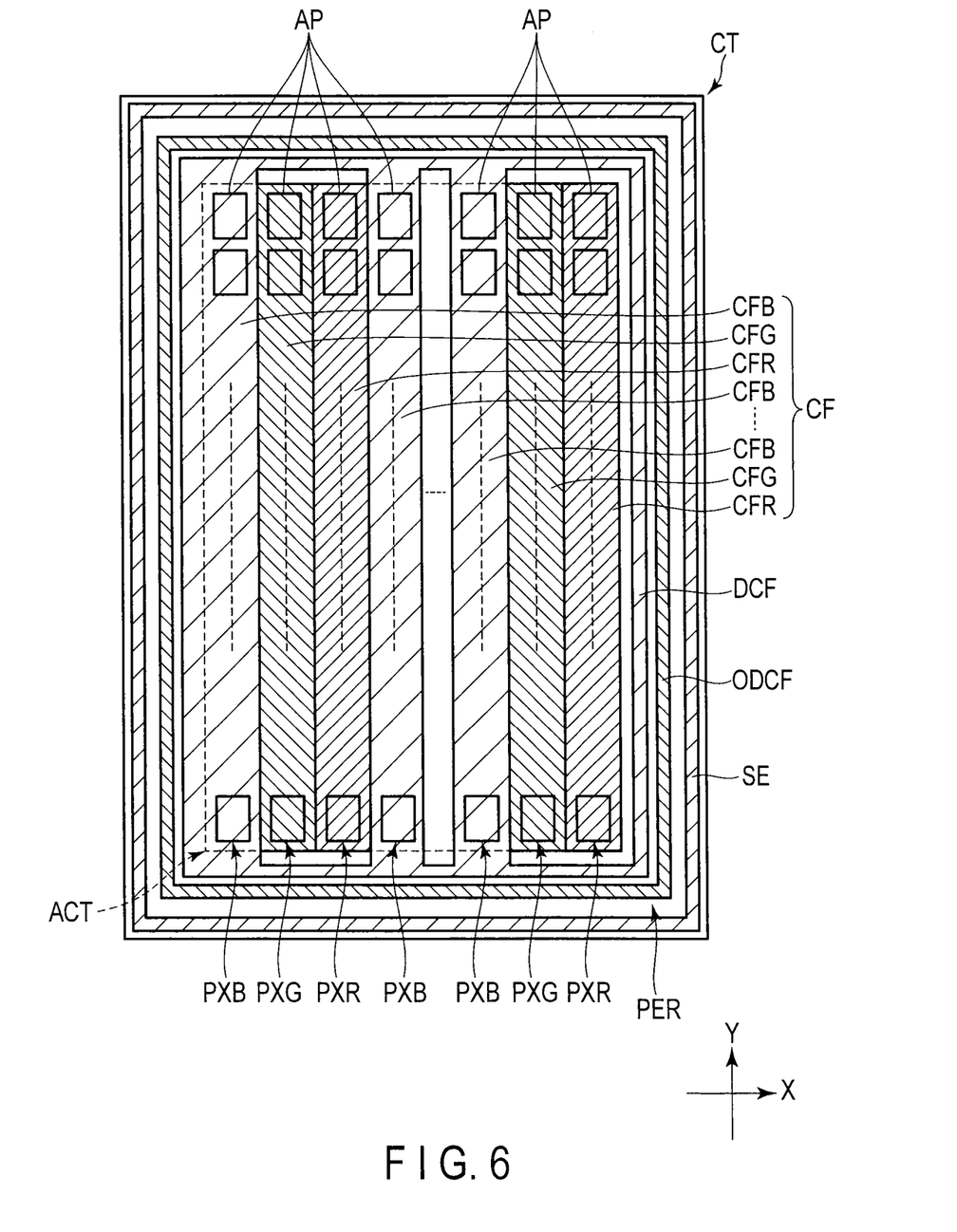
FIG. 6 is a plan view which schematically shows another structure of the counter-substrate which is applicable to the liquid crystal display device of the embodiment.

FIG. 6 is a plan view which schematically shows another structure of the counter-substrate CT which is applicable to the liquid crystal display device of the embodiment.

The structure shown in FIG. 6 differs from the structure shown in FIG. 2 in that the counter-substrate CT further includes an outermost peripheral dummy color filter ODCF in the peripheral area PER. The outermost peripheral dummy color filter ODCF is located between the dummy color filter DCF and the sealant SE, and is spaced apart from the dummy color filter DCF and the sealant SE. In addition, the outermost peripheral dummy color filter ODCF is stacked on the light-shield layer BM in the peripheral area PER.

In the example illustrated, the outermost peripheral dummy color filter ODCF is disposed between the dummy color filter DCF and the sealant SE in a manner to surround the dummy color filter DCF, and is formed in a rectangular frame shape. Specifically, a gap is created between the outermost peripheral dummy color filter ODCF and the dummy color filter DCF. In the meantime, it is desirable that the gap between the outermost peripheral dummy color filter ODCF and the dummy color filter DCF be within a range of 100 µm.

This outermost peripheral dummy color filter ODCF has the same color as the dummy color filter DCF, for instance. When the dummy color filter DCF is formed of a resin material which is colored in blue, as in the above-described example, the outermost peripheral dummy color filter ODCF is also formed of a resin material which is colored in blue. In the meantime, the outermost peripheral dummy color filter ODCF may be formed of a resin material which is colored in red or a resin material which is colored in green.

Figure 7:
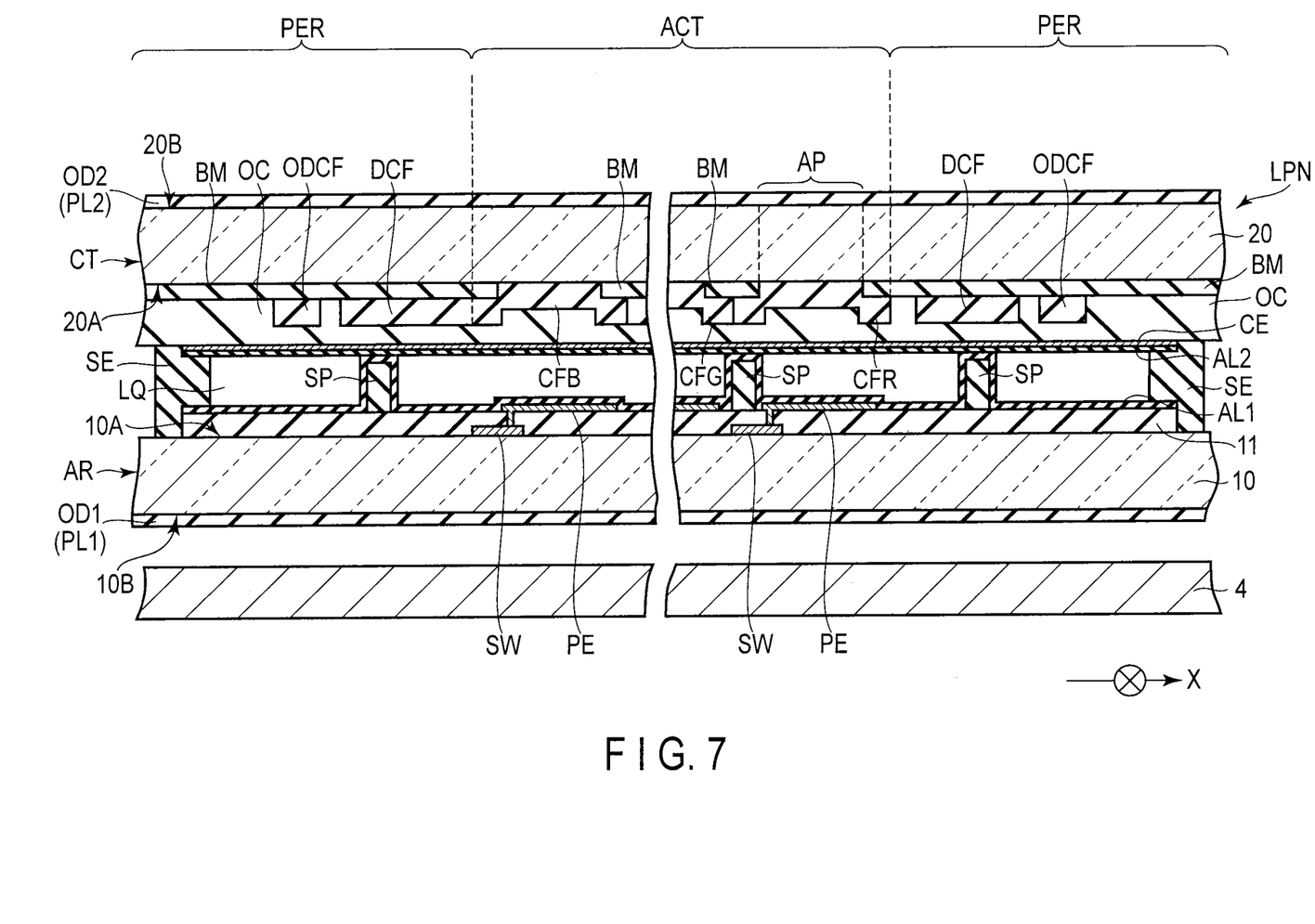
FIG. 7 is a cross-sectional view which schematically shows a cross-sectional structure of a liquid crystal display panel, to which the counter-substrate shown in FIG. 6 is applied.

FIG. 7 is a cross-sectional view which schematically shows a cross-sectional structure of a liquid crystal display panel LPN, to which the counter-substrate shown in FIG. 6 is applied.

The dummy color filter DCF and outermost dummy color filter ODCF are stacked on the light-shield layer BM in the peripheral area PER and are covered with the overcoat layer OC. The dummy color filter DCF and outermost dummy color filter ODCF can be formed by using the same material as the blue color filter CFB in the same fabrication step as the blue color filter CFB.

Figure 8:
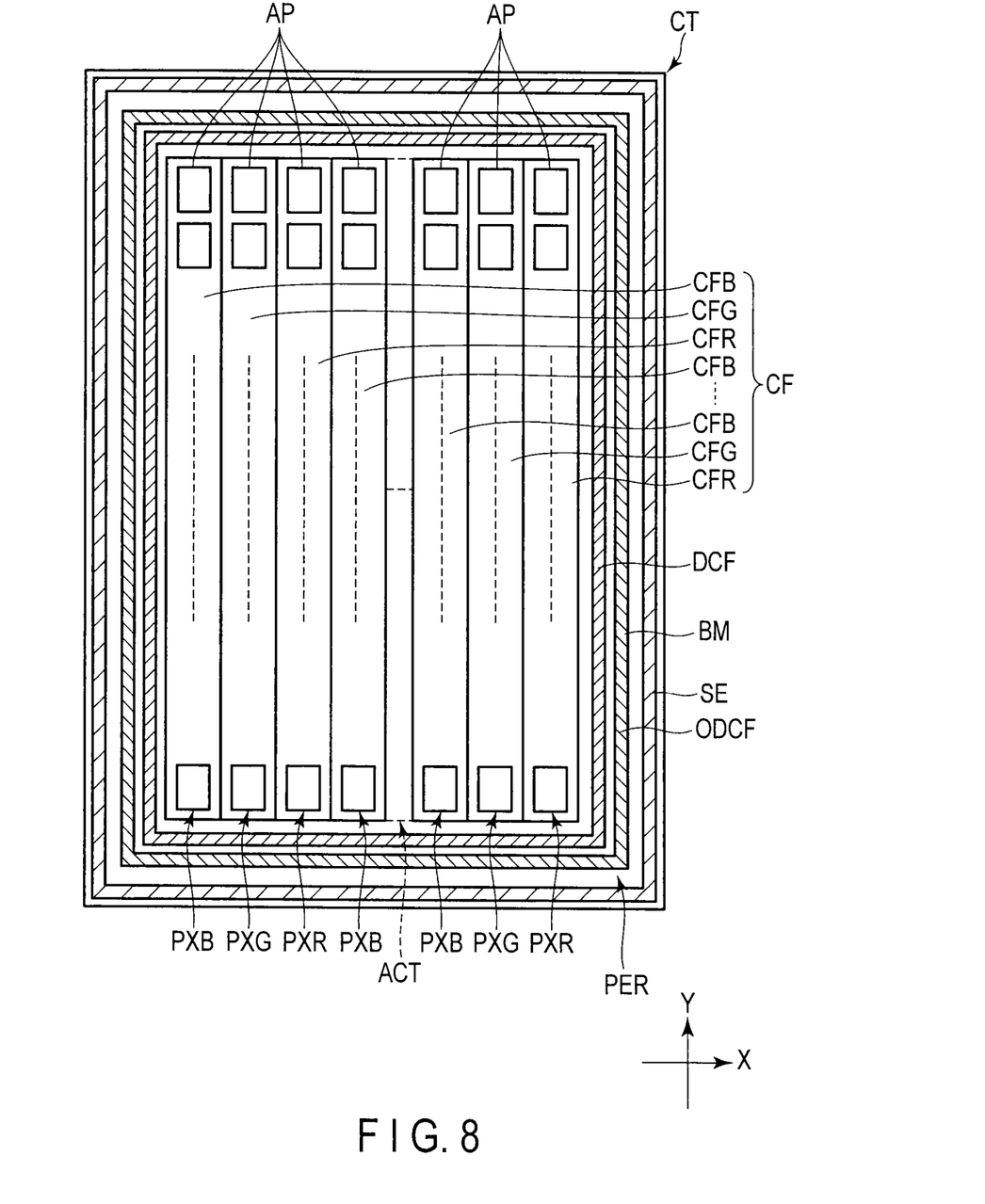
FIG. 8 is a plan view which schematically shows another structure of the counter-substrate which is applicable to the liquid crystal display device of the embodiment.

FIG. 8 is a plan view which schematically shows another structure of the counter-substrate CT which is applicable to the liquid crystal display device of the embodiment.

The structure shown in FIG. 8 differs from the structure shown in FIG. 5 in that the counter-substrate CT further includes an outermost peripheral dummy color filter ODCF in the peripheral area PER. As has been described with reference to FIG. 6, the outermost peripheral dummy color filter ODCF is located on the sealant SE side of the dummy color filter DCF, and is spaced apart from the dummy color filter DCF. In addition, the outermost peripheral dummy color filter ODCF is stacked on the light-shield layer BM in the peripheral area PER.

This outermost peripheral dummy color filter ODCF has the same color as the dummy color filter DCF, for instance, and is formed of a resin material which is colored in blue. Alternatively, the outermost peripheral dummy color filter ODCF may be formed of a resin material which is colored in red or a resin material which is colored in green.

Even in the case where any one of the counter-substrates CT shown in FIG. 5, FIG. 6 and FIG. 8 is applied, the same advantageous effects as in the case where the counter-substrate CT shown in FIG. 2 is applied can be obtained.

In the embodiment, each of the dummy color filter DCF and outermost peripheral dummy color filter ODCF may not be formed in a continuous frame shape, but may be formed of a plurality of segments which are discretely arranged in a substantially linear shape.

As has been described above, according to the present embodiment, a liquid crystal display device which has a good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate including pixel electrodes which are disposed, respectively, in a first color pixel on one end side of an active area and in a second color pixel on the other end side of the active area;
   a second substrate including a light-shield layer which surrounds the first color pixel and the second color pixel of the active area and extends to a peripheral area surrounding the active area, a first color filter which is disposed in the first color pixel, a second color filter which is disposed in the second color pixel, a dummy color filter which is stacked on the light-shield layer in the peripheral area, surrounds the active area, creates a first distance between second color filter and the dummy color filter and is continuous with the first color filter, and an overcoat layer which covers the light-shield layer, the first color filter, the second color filter and the dummy color filter;
   a columnar spacer configured to create a cell gap between the first substrate and the second substrate;
   a sealant which surrounds the dummy color filter in the peripheral area, is spaced apart from the dummy color filter, and attaches the first substrate and the second substrate; and
   a liquid crystal layer held between the first substrate and the second substrate.

2. The liquid crystal display device of claim 1, wherein the second substrate further includes an outermost peripheral dummy color filter which is located between the dummy color filter and the sealant in the peripheral area, creates a second distance between the outermost peripheral dummy color filter and the dummy color filter, is stacked on the light-shield layer, and is covered with the overcoat layer.

3. The liquid crystal display device of claim 2, wherein the dummy color filter has a color which is identical to a color of the first color filter and is different from a color of the second color filter.

4. The liquid crystal display device of claim 3, wherein the first color filter and the dummy color filter are formed of a resin material which is colored in blue.

5. The liquid crystal display device of claim 4, wherein the outermost peripheral dummy color filter has the same color as the dummy color filter.

6. The liquid crystal display device of claim 5, wherein the outermost peripheral dummy color filter is formed of the same material as the dummy color filter.

7. The liquid crystal display device of claim 1, wherein the first distance between the second color filter and the dummy color filter is 2 µm to 10 µm.

8. The liquid crystal display device of claim 1, wherein the dummy color filter has a width of 20 µm to 50 µm.

9. The liquid crystal display device of claim 2, wherein the second distance between the outermost peripheral dummy color filter and the dummy color filter is within a range of 100 µm.

10. A liquid crystal display device comprising:
    a first substrate including pixel electrodes which are disposed, respectively, in a first color pixel on one end side of an active area and in a second color pixel on the other end side of the active area;
    a second substrate including a light-shield layer which surrounds the first color pixel and the second color pixel of the active area and extends to a peripheral area surrounding the active area, a first color filter which is disposed in the first color pixel, a second color filter which is disposed in the second color pixel and has a color different from a color of the first color filter, a dummy color filter which is stacked on the light-shield layer in the peripheral area, surrounds the active area, is spaced apart from the second color filter, is continuous with the first color filter and has the same color as the first color filter, and an overcoat layer which covers the light-shield layer, the first color filter, the second color filter and the dummy color filter;
    a columnar spacer configured to create a cell gap between the first substrate and the second substrate;
    a sealant which surrounds the dummy color filter in the peripheral area, is spaced apart from the dummy color filter, and attaches the first substrate and the second substrate; and
    a liquid crystal layer held between the first substrate and the second substrate.

11. The liquid crystal display device of claim 10, wherein the first color filter and the dummy color filter are formed of a resin material which is colored in blue.

12. The liquid crystal display device of claim 11, wherein the second substrate further includes an outermost peripheral dummy color filter which is located between the dummy color filter and the sealant in the peripheral area, is spaced apart from the dummy color filter, is stacked on the light-shield layer, and is covered with the overcoat layer.

13. The liquid crystal display device of claim 12, wherein the outermost peripheral dummy color filter has the same color as the dummy color filter.

14. The liquid crystal display device of claim 13, wherein the outermost peripheral dummy color filter is formed of the same material as the dummy color filter.

15. A liquid crystal display device comprising:
    a first substrate including pixel electrodes which are disposed, respectively, in a first color pixel on one end side of an active area and in a second color pixel on the other end side of the active area;
    a second substrate including a light-shield layer which surrounds the first color pixel and the second color pixel of the active area and extends to a peripheral area surrounding the active area, a first color filter which is disposed in the first color pixel, a second color filter which is disposed in the second color pixel, a dummy color filter which is stacked on the light-shield layer in the peripheral area, surrounds the active area and is spaced apart from the second color filter, and an overcoat layer which covers the light-shield layer, the first color filter, the second color filter and the dummy color filter;
    a columnar spacer configured to create a cell gap between the first substrate and the second substrate;
    a sealant which surrounds the dummy color filter in the peripheral area, is spaced apart from the dummy color filter, and attaches the first substrate and the second substrate; and
    a liquid crystal layer held between the first substrate and the second substrate.

16. The liquid crystal display device of claim 15, wherein the dummy color filter has a color which is identical to a color of the first color filter and is different from a color of the second color filter.

17. The liquid crystal display device of claim 16, wherein the dummy color filter is continuous with the first color filter.

18. The liquid crystal display device of claim 16, wherein the dummy color filter is spaced apart from the first color filter.

19. The liquid crystal display device of claim 16, wherein the second substrate further includes an outermost peripheral dummy color filter which is located between the dummy color filter and the sealant in the peripheral area, is spaced apart from the dummy color filter, is stacked on the light-shield layer, and is covered with the overcoat layer.

20. The liquid crystal display device of claim 19, wherein the first color filter, the outermost peripheral dummy color filter and the dummy color filter are formed of a resin material which is colored in blue.

* * * * *